(No Model.)
W. T. BROWN.
CHURN POWER.
No. 483,134.  Patented Sept. 27, 1892.
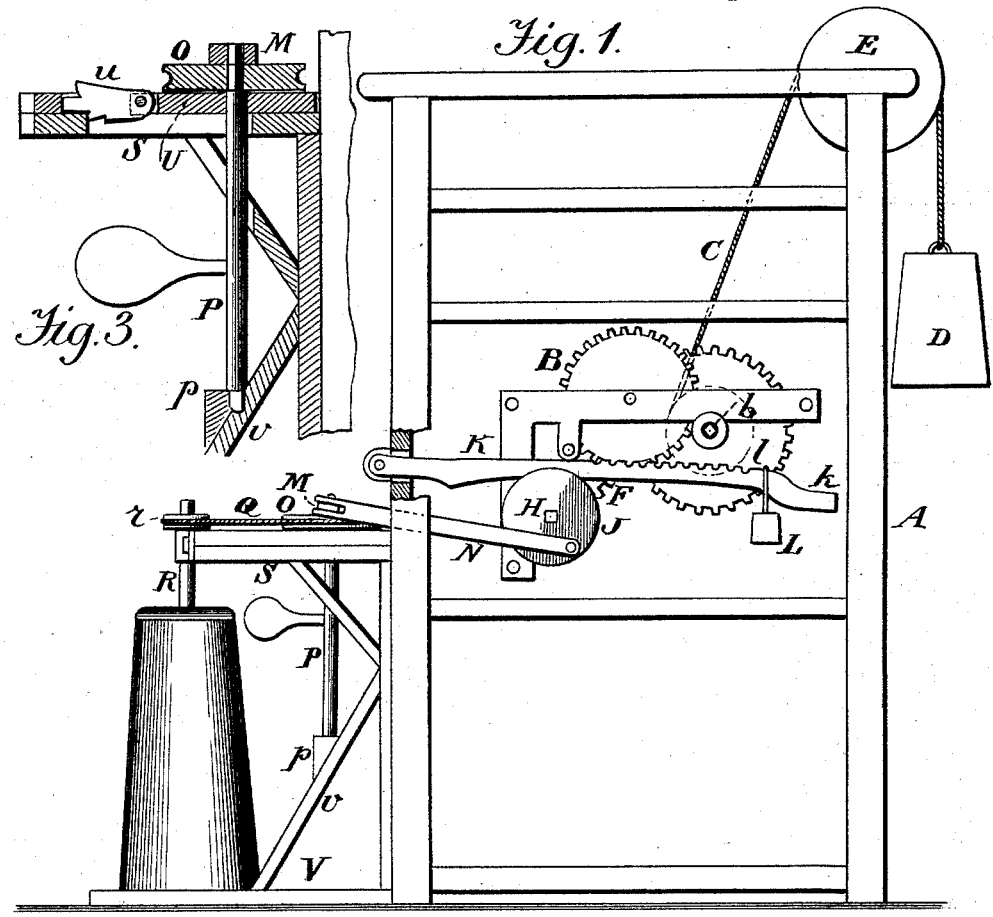
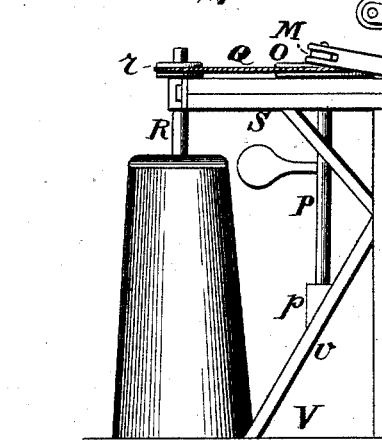
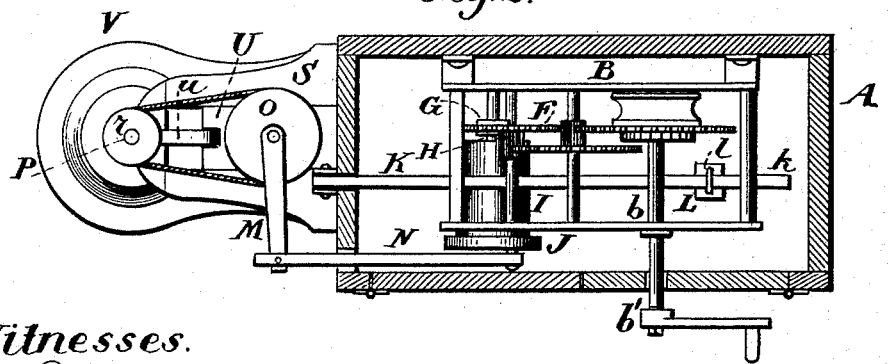
Witnesses.
A. Ruppert,
G. B. Towles.
Inventor.
William T. Brown.
Per
Thomas P. Simpson.
Atty

UNITED STATES PATENT OFFICE.

WILLIAM T. BROWN, OF SANDY HOOK, KENTUCKY, ASSIGNOR OF THREE-FOURTHS TO BRYANT B. FANNIN, ROBERT T. PARSONS, AND JAMES M. DUVALL, ALL OF SAME PLACE.

CHURN-POWER.

SPECIFICATION forming part of Letters Patent No. 483,134, dated September 27, 1892.

Application filed April 30, 1892. Serial No. 431,235. (No model.)

*To all whom it may concern:*

Be it known that I, WILLIAM T. BROWN, a citizen of the United States, residing at Sandy Hook, in the county of Elliott and State of Kentucky, have invented certain new and useful Improvements in Churn-Powers; and I do hereby declare the following to be a full, clear, and exact description of the invention, such as will enable others skilled in the art to which it appertains to make and use the same.

The special object of the invention is to make a weight-power mechanism or motor by which a churn may be operated, and at the same time a fan for keeping off flies and cooling the air around the churn.

Figure 1 of the drawings is a front elevation; Fig. 2, a view, partly in plan and partly in horizontal section; and Fig. 3, a detail view of the fan mechanism.

In the drawings, A represents a kitchen-safe, shelved in the usual way and containing a clock mechanism B, whose windlass-shaft $b$ is connected by a cord C with the weight D, said cord passing up through the shelves and top of safe over a pulley E. The shaft $b$ is wound up to raise the weight to the desired height by a hand-crank $b'$. The clock mechanism B is also connected by the spur-wheel F and pinion G with a shaft H, on which are made fast the roll I and disk J.

K is a rod pivoted at one end to a side of the safe or loosely held in a vertical hole thereof, so as to permit it to be raised or lowered and have a tendency to drop into a vertical position. The upper edge of this rod or lever is notched, so that a weight L may be suspended by a hook or loop $l$ nearer to or farther from the roller on which the lever has a bearing. By this means the friction on the roller may be increased or diminished, so as to regulate the velocity at which the weight may run down and the churn may be operated. By putting the weight in the last notch near the handle $k$ the mechanism is held still after the cord has been wound up until the operator has fixed everything about the churn and is ready to start. A crank-pin of the disk J is connected by a pivoted pitman N with one end of the arm M, which carries at the other end a pulley O and a fan-shaft P, the latter being vertical and pivoted at the bottom in a bearing $p$. The pulley O is connected by a cord Q with a churn-dasher R, stepped or journaled in the center of the churn-bottom.

S is an outside platform on which the pulley O turns, and in a concavity of this is placed the movable bearing U for the fan-shaft P', said bearing being provided with a hinged handle $u$, notched on the under side for use, as hereinafter described.

The clock mechanism being in a safe is protected from children and accidents of many kinds, while the fan keeps off dust and flies.

When ready to have a churning, the weight L is hung on the end notch near the handle and the power-weight D wound up. Then set the churn on the bottom piece V against the brace $v$. Next put in the dasher R and connect its pulley $r$ with the pulley O by drawing forward the movable bearing U. The latter is then replaced by carrying it toward the safe until the notched piece $u$ catches and the cord between the pulley $O^2$ is taut.

What I claim as new is—

1. The combination, with a crank-pin, a disk J, and mechanism to rotate said disk, of a pivoted pitman N, arm M, pulley O, fan-shaft P, cord Q, pulley $r$, and shaft R, whereby fan and shaft may be simultaneously operated, as set forth.

2. The combination of a fan-shaft P, platform S, and movable bearing U, the latter being provided with a hinged handle $u$, notched on the under side, as and for the purpose specified.

In testimony whereof I affix my signature in presence of two witnesses.

WILLIAM T. BROWN.

Witnesses:
  B. B. FANNIN,
  W. B. LEMASTER.